United States Patent [19]
Takubo et al.

[11] Patent Number: 5,373,378
[45] Date of Patent: Dec. 13, 1994

[54] ACTIVE MATRIX TYPE LIQUID CRYSTAL DISPLAY DEVICE WITH PERIPHERAL PIXEL ELECTRODES ATTACHED DIRECTLY TO SIGNAL LINES

[75] Inventors: Yoneharu Takubo, Toyonaka; Ikunori Kobayashi, Sakai; Tetsu Ogawa, Osaka, all of Japan

[73] Assignee: Matsushita Electric Industrial Co. Ltd., Osaka, Japan

[21] Appl. No.: 53,414

[22] Filed: Apr. 28, 1993

[51] Int. Cl.$^5$ .......................................... G02F 1/1343
[52] U.S. Cl. ........................................ 359/59; 359/54; 359/58
[58] Field of Search .............................. 359/54, 59, 58

[56] References Cited

U.S. PATENT DOCUMENTS 5,285,301  2/1994  Shirahashi et al. ................. 359/59

FOREIGN PATENT DOCUMENTS 63-200127  8/1988  Japan .
63-236009  9/1988  Japan .
1-180526   7/1989  Japan .

OTHER PUBLICATIONS

Patent Abstracts of Japan, vol. 16, No. 237 (P-1362) 29 May 1992 & JP-A-04 050 923 (Seiko Epson) 19 Feb. 1992 *abstract*.
Patent Abstracts of Japan, vol. 8, No. 21 (E-224)(1458) 28 Jan. 1984 & JP-A-58 184 758 (Suwa Seikosha) 28 Oct. 1983 *abstract*.

*Primary Examiner*—Anita Pellman Gross
*Assistant Examiner*—Charles Miller
*Attorney, Agent, or Firm*—Wenderoth, Lind & Ponack

[57] ABSTRACT

Pixel electrodes in the periphery of a thin film transistor array (peripheral part of the display screen) of an active matrix type liquid crystal display device are directly electrically shortcircuited with signal lines, whereby an alternating current signal is always applied to the pixel electrodes without being passed through a thin film transistor as a switching element. Thereby the liquid crystal arranged on the peripheral part of the display screen is driven in a static state resulting in a high stability against the display characteristics.

2 Claims, 5 Drawing Sheets

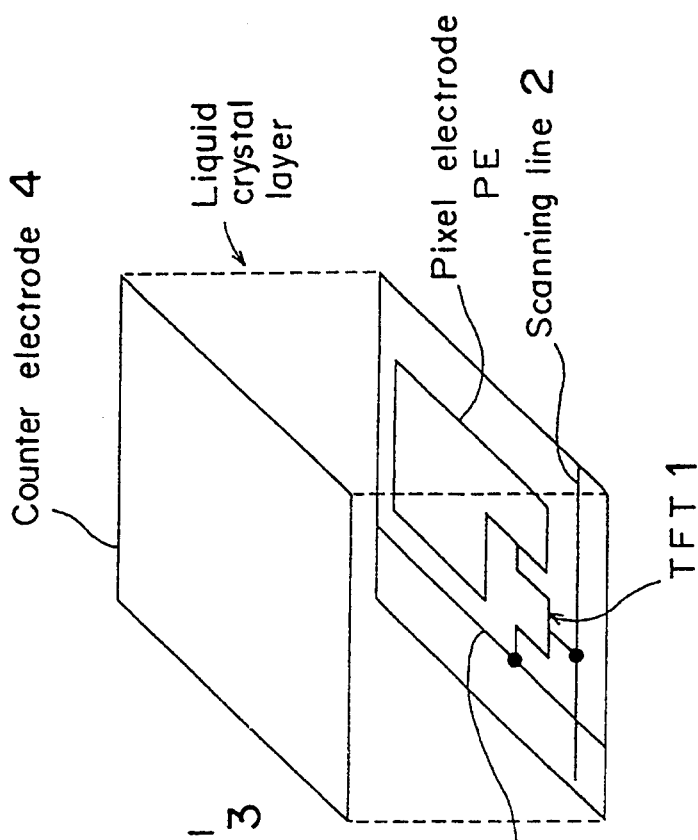
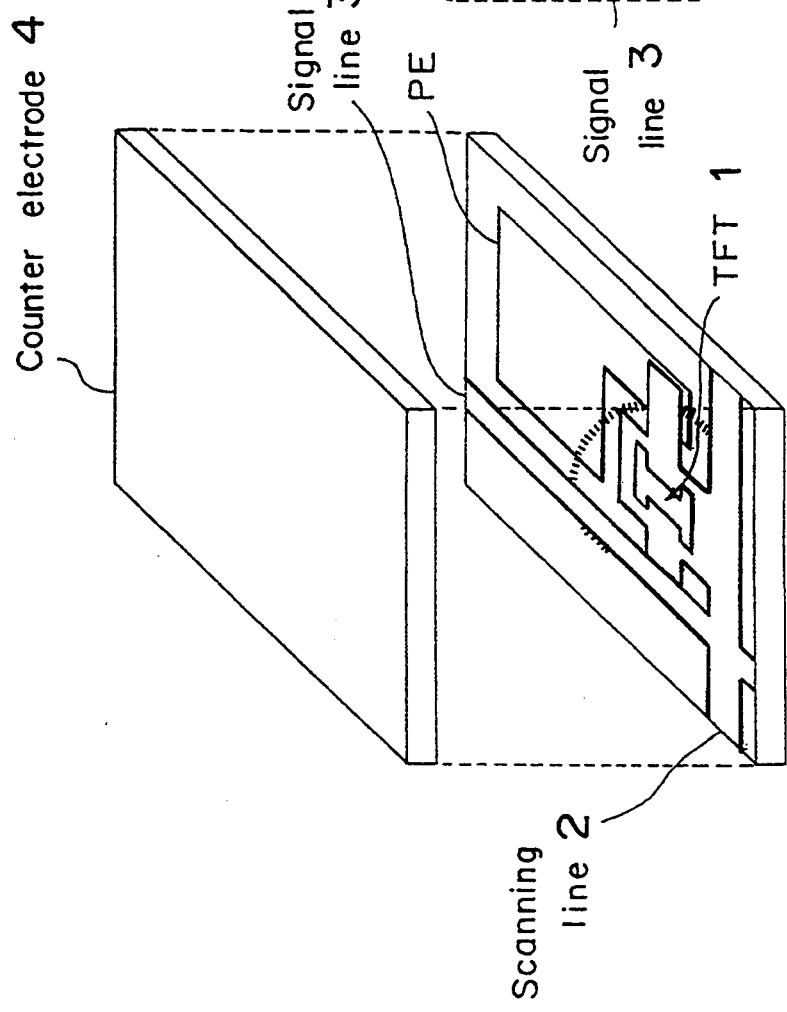
Fig. 2(b)
Fig. 2(a)

ACTIVE MATRIX TYPE LIQUID CRYSTAL DISPLAY DEVICE WITH PERIPHERAL PIXEL ELECTRODES ATTACHED DIRECTLY TO SIGNAL LINES

BACKGROUND OF THE INVENTION

1. Field of the Invention

The present invention relates to an active matrix type liquid crystal display device used in a liquid crystal display panel or a liquid crystal light valve, etc.

2. Description of the Prior Art

Today, display devices using liquid crystal (liquid crystal display devices) have been applied in various kinds of field such as finders of video cameras, pocket TVs, highly fine projector-type TVs, and personal computers, word processors or the like data display terminals. The development and commercialization of the above display devices are proceeded lively. Particularly, an active matrix type liquid crystal display device of all draws a passionate attention, because it ensures high quality of the image. The active matrix type is a contractive driving method of liquid crystal to the conventionally-employed simple matrix type. More specifically, in the active matrix driving method, each pixel electrode disposed on the matrix is provided with a switching element, to which is independently supplied an electric signal to control the optical characteristic of the liquid crystal through the switching element. Therefore, the active matrix driving method can maintain high contrast even at the time of a large-capacity display, without accompanying crosstalk, not alike the conventional simple matrix method.

Currently, a thin film transistor is mainly used for the switching element in the active matrix driving method. FIG. 2 is a schematic equivalent circuit diagram of an active matrix type liquid crystal device using a thin film transistor array according to the prior art.

As indicated in FIG. 5, a thin film transistor (TFT) 1 as a switching element provided for each pixel electrode supplies an electric signal of a signal line 3 to the subject pixel electrode when the transistor 1 is selected by a scanning line 2. The signal line 3 is electrically insulated from the pixel electrode when the thin film transistor 1 is not selected. When the scanning line 2 makes no selection, the pixel potential is held by a liquid crystal capacitor 5 formed between the pixel electrode and a counter electrode 4 confronting the pixel electrode via a liquid crystal layer. Therefore, it is generally practiced that a storage capacitor 6 is formed at the side of the TFT 1 parallel to the liquid crystal capacitor 5 via the pixel electrode and the insulating layer so as to improve the voltage retention efficiency of the pixel electrode when the scanning line 2 does not select the transistor. The stability of the pixel potential (voltage applied to the liquid crystal) at the non-selecting time is greatly dependent on the characteristics oft he liquid crystal layer and the insulating layer constituting the storage capacitor. In other words, if the liquid crystal layer has a low resistance, a current leak occurs due to the resistance of the liquid crystal layer at the non-selecting time of the scanning line 2, thereby decreasing the voltage between the pixel electrode and the counter electrode 4. As a result of this, the effective voltage to be fed to the liquid crystal is lowered, which causes the optical characteristic of the liquid crystal to be deteriorated. It is needless to say that the same phenomenon as above is brought about also in the case where the resistance of the TFT 1 as the switching element is low at the non-selecting time. Accordingly, the stability of the electric characteristic of the liquid crystal layer and the TFT 1, and the design of the storage capacitor, i.e., the voltage retention stability of the liquid crystal layer at the non-selecting time, etc. play an important role to improve the reliability of the active matrix type liquid crystal display device.

Meanwhile, it is well known that the optical characteristic of the liquid crystal is deteriorated with time as a direct current voltage is applied to the liquid crystal. Nevertheless, it cannot be avoided in the active matrix type liquid crystal device that a direct current voltage is applied between the scanning line 2 or signal line 3 and the counter electrode 4. A direct current voltage which is negative to the counter electrode 4 is applied to pixels arranged particularly in the vicinity of outgoing electrodes of the scanning lines, namely, in the periphery of the display screen almost all the time. If the liquid crystal panel is continuously driven for a long time at high temperatures according to the conventional active matrix driving method, the voltage retention characteristic of the liquid crystal is changed from the periphery, resulting in the luminance irregularity or color irregularity consequent to the change of the transmittance of the panel.

SUMMARY OF THE INVENTION

An object of the present invention is therefore to provide an active matrix type liquid crystal device which realizes stabilization and improvement of the display characteristic, with suppressing the change of its optical characteristic with time.

In order to achieve the aforementioned object, an active matrix type liquid crystal display device with a thin film transistor array for driving pixels in accordance with driving signals applied from signal lines when selected by corresponding scan lines wherein each of pixel electrodes of pixels arranged within an area of a display screen is connected to corresponding signal line through corresponding one of thin film transistors forming said thin film transistor array and each of pixel electrodes of peripheral pixels arranged outside said display screen is connected to corresponding signal line directly.

In the above-described constitution of the active matrix type liquid crystal display device, an alternating current constant signal is applied to the pixel electrodes corresponding to at least one or more signal lines at both outgoing ends of the scanning lines without being passed through a TFT as a switching element. Accordingly, the liquid crystal in the vicinity of the outgoing side of the scanning lines 2 where the characteristic is easy to be changed with time can be driven in the static state, and moreover the impressing amount of direct Current voltage is reduced. Thus, the generation of the luminance irregularity and color irregularity with time can be suppressed.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2(a) is a schematic perspective view of one of pixels arranged within a display screen according to the first embodiment;

FIG. 2(b) is an equivalent circuit diagram of the pixel shown in FIG. 2(a);

DETAILED DESCRIPTION OF THE PREFERRED EMBODIMENTS

Preferred embodiments of the present invention will be discussed below with reference to the accompanying drawings.

Figure 1:
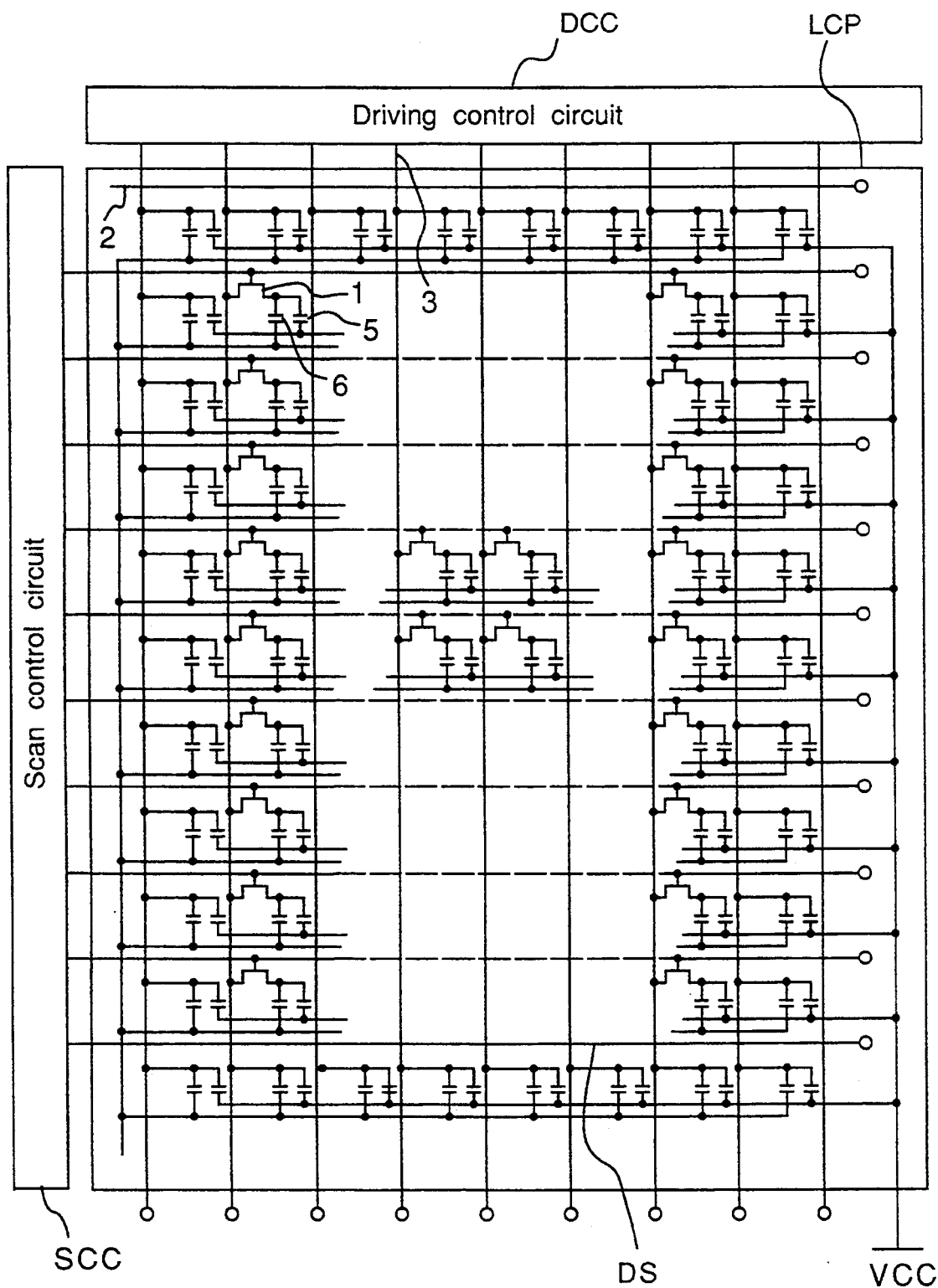
Fig. 1 is a schematic equivalent circuit diagram of a liquid crystal display device using a thin film transistor array according to a first embodiment of the present invention.

FIG. 1 is a schematic equivalent circuit diagram of a liquid crystal display device using a thin film transistor array according to a first embodiment of the present invention. As shown in FIG. 1, a scan control circuit SCC is arranged along one side of a liquid crystal panel LCP of active matrix type and, along another side of the liquid crystal panel LCP, a driving control circuit DCC is arranged. The scan control circuit SCC scans scanning lines (gate lines) 2 sequentially and the driving control circuit DCC applies drive signals to respective signal lines 3 (source lines). central portion of the liquid crystal panel LCP except for peripheral area thereof is defined as a display screen DS for displaying an image in accordance with drive signals from the driving control circuit DCC.

Figure 3B:
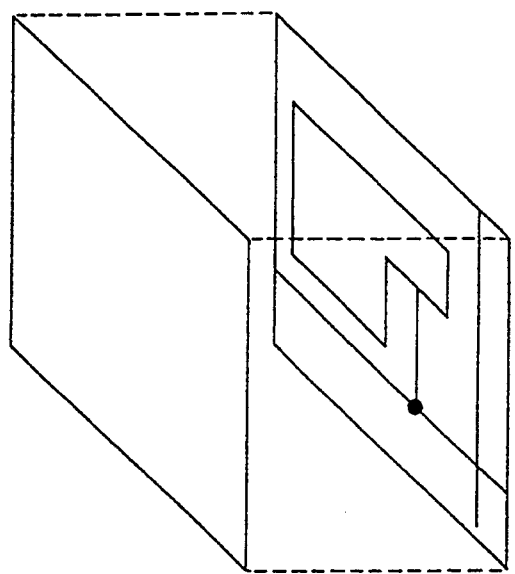
FIG. 3(b) is an equivalent circuit diagram of the pixel shown in FIG. 3(a)
Figure 3A:
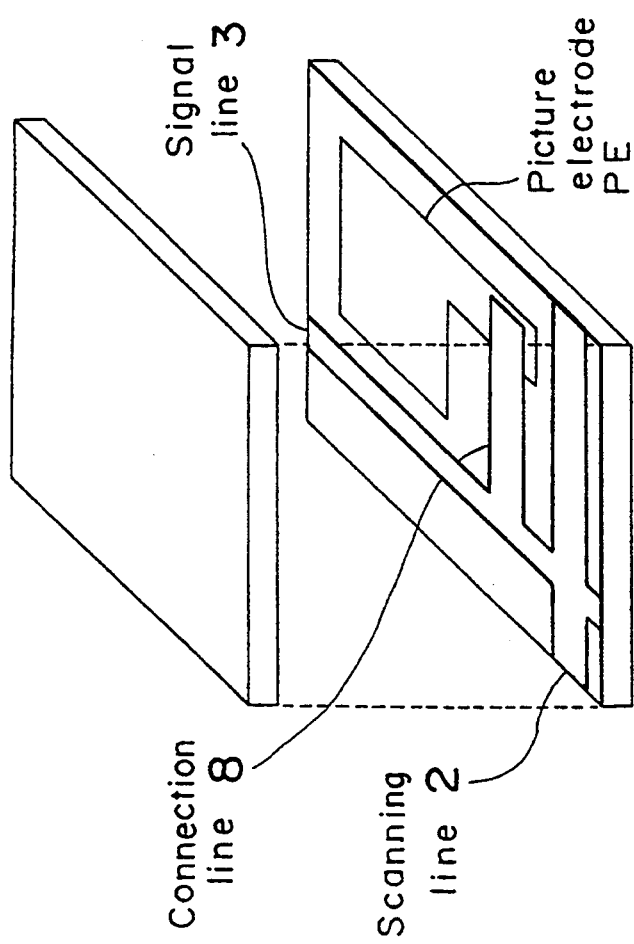
FIG. 3(a) is a schematic perspective view of one of peripheral pixels arranged outside the display screen according to the first preferred embodiment.
Figure 5:
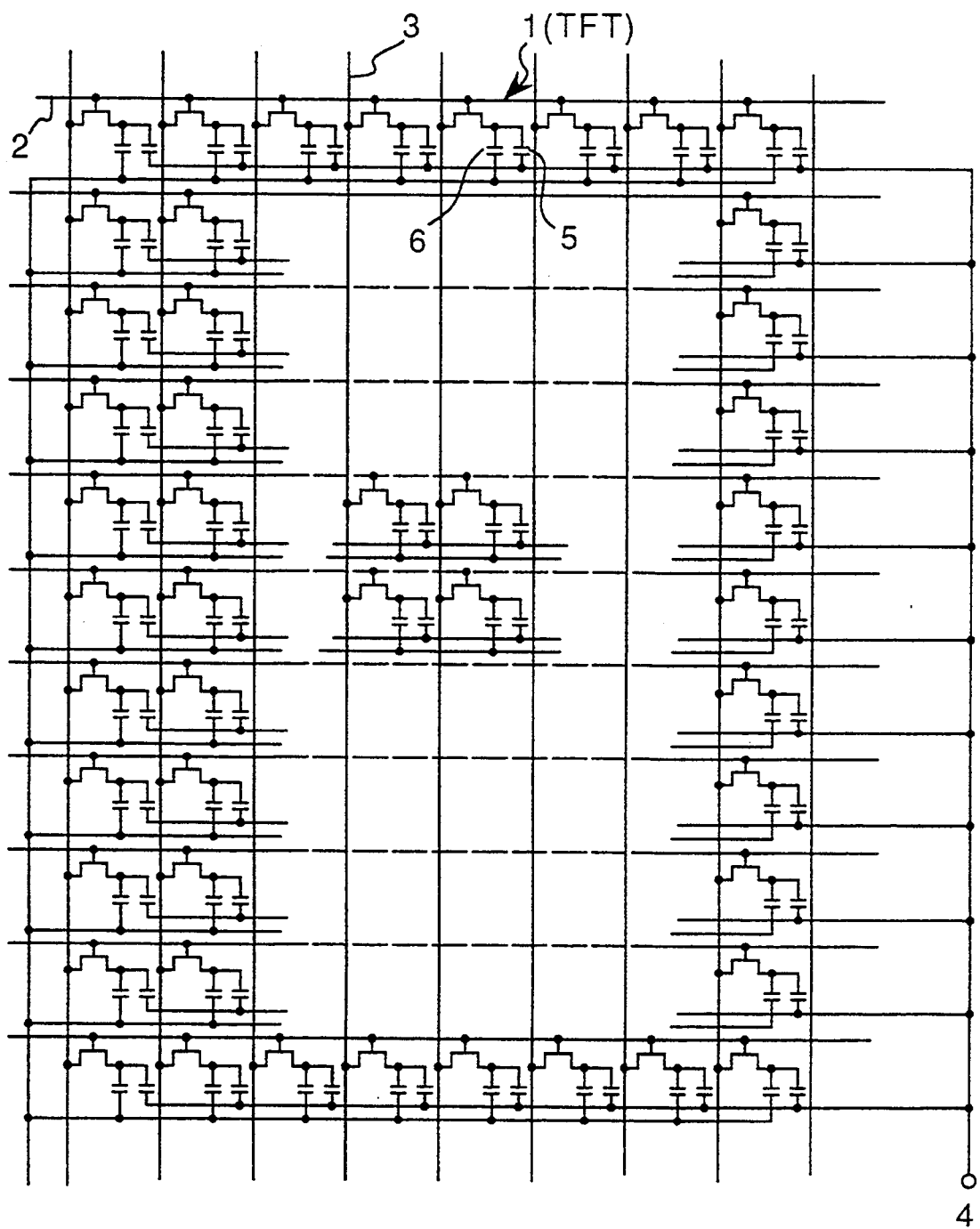
FIG. 5 is a schematic equivalent circuit diagram of a liquid crystal display device using a conventional thin film transistor array.

As shown in FIG. 2(a) and/or FIG. 2(b), each pixel electrode PE of pixels arranged within the display screen DS is connected to a scanning line 2 and a signal line 3 by a TFT 1 as a switching element in the same manner as in the conventional example shown in FIG. 5.

contrary to the above, pixel electrodes of peripheral pixels arranged outside the display screen DS are not provided with TFT i and electrically connected to the respective signal lines 3 through connection lines 8 directly, as clearly shown in FIG. 3(a) and/or FIG. 3(b).

Each counter electrode 4 confronting to corresponding pixel electrode PE is connected to a power source having a standard voltage Vcc as shown in FIG. 1. The constitution as above is easily realized by shortcircuiting a source electrode line and a drain electrode when a transistor is formed in the manufacturing process of the thin film transistor array.

Because of the above constitution, the potential of the signal lines 3 is always applied to the pixel electrodes in the periphery of the thin film transistor array, so that the liquid crystal in this section is driven independently of the voltage retention characteristic. The electrooptic characteristic of the liquid crystal in the periphery of the array is accordingly stabilized and the optical characteristic is restrained from changing from the periphery of the display screen with time.

The present inventors confirmed by a comparison test at a high temperature that the liquid crystal display device according to the present invention exhibited the stability against the display characteristic especially the luminance irregularity and/or color irregularity five times as high as or more than that of the conventional liquid crystal display device.

Figure 4:
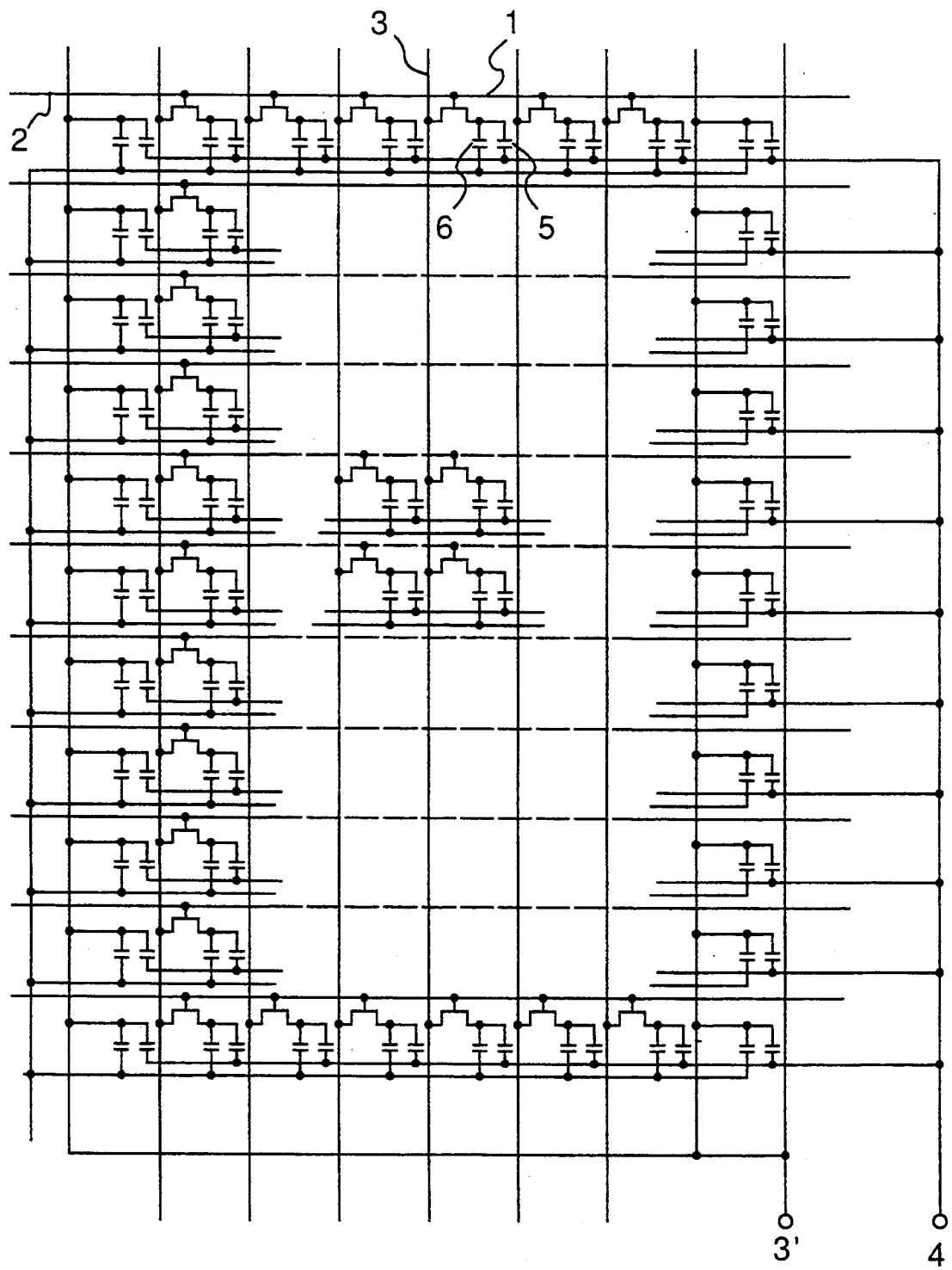
FIG. 4 is a schematic equivalent circuit diagram of a liquid crystal display device using a thin film transistor array according to a second embodiment of the present invention.

FIG. 4 shows a schematic equivalent circuit diagram of a liquid crystal display device using a thin film transistor array according to a second embodiment of the present invention. The constitution of the liquid crystal display device within the display screen area is the same as that shown in FIG. 1. According to the second embodiment, the signal lines 3 and only the pixel electrodes at both ends of the outgoing side of the scanning lines 2 to which a direct current voltage is particularly prone to be impressed among the pixel electrodes in the periphery of the array (only the pixel electrodes corresponding to the signal lines at both ends on the thin film transistor array substrate) are shortcircuited. Moreover, according to the second embodiment, an alternating current voltage Which is always constant to a counter voltage is supplied as a different signal to a signal line 3' of the pixel electrodes directly electrically connected to the signal line 3, thereby to reduce the direct current voltage impressed to the liquid crystal in the vicinity of the outgoing side of the scanning lines 2. More specifically, rectangular waves of ±3(V) to the counter voltage and 100 Hz driving frequency are supplied to the signal line 3'.

Similar to the liquid crystal display device of the first embodiment, when the change of the display characteristic with time is observed as the active matrix type liquid crystal display device of the second embodiment is driven at high temperatures, 5 times or more stability is confirmed than in the conventional arrangement. Moreover, when the display stability is observed while the driving frequency of the voltage impressed to the pixel electrodes directly electrically connected to the signal line 3' is changed, a favorable result is obtained when the driving frequency is 60 Hz or higher.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An active matrix type liquid crystal display device with a thin film transistor array for driving pixels in accordance with driving signals applied from signal lines when selected by corresponding scan lines;

wherein each of pixel electrodes of pixels arranged within an area of a display screen is connected to corresponding signal line through corresponding one of thin film transistors forming said thin film transistor array, and each of pixel electrodes of peripheral pixels arranged outside said display screen is connected to corresponding signal line directly.

2. The active matrix type liquid crystal display device according to claim 1 wherein an alternating current signal of 60 Hz or higher is applied to each signal line connected to said peripheral pixels.

* * * * *